US012360694B2

(12) United States Patent
Varghese et al.

(10) Patent No.: US 12,360,694 B2
(45) Date of Patent: Jul. 15, 2025

(54) JOURNAL REPLAY OPTIMIZATION

(71) Applicant: NetApp Inc., San Jose, CA (US)

(72) Inventors: Kevin Daniel Varghese, San Jose, CA (US); Ananthan Subramanian, San Ramon, CA (US); Asif Imtiyaz Pathan, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/399,555

(22) Filed: Dec. 28, 2023

(65) Prior Publication Data

US 2024/0143210 A1 May 2, 2024

Related U.S. Application Data

(63) Continuation of application No. 17/728,441, filed on Apr. 25, 2022, now Pat. No. 11,861,198.

(51) Int. Cl.
*G06F 3/06* (2006.01)

(52) U.S. Cl.
CPC ............ *G06F 3/064* (2013.01); *G06F 3/0619* (2013.01); *G06F 3/0656* (2013.01); *G06F 3/0659* (2013.01); *G06F 3/067* (2013.01)

(58) Field of Classification Search
CPC ........ G06F 3/064; G06F 3/0659; G06F 3/067; G06F 3/0619; G06F 3/0656
See application file for complete search history.

(56) References Cited

U.S. PATENT DOCUMENTS

| 7,562,078 | B1 * | 7/2009 | Yadav | G06F 16/10 |
| | | | | 707/999.009 |
| 7,752,402 | B2 | 7/2010 | Fachan et al. | |
| 8,010,509 | B1 * | 8/2011 | Khurana | G06F 11/2064 |
| | | | | 707/697 |
| 11,481,121 | B2 * | 10/2022 | Peterson | G06F 3/0619 |
| 11,861,198 | B2 | 1/2024 | Varghese et al. | |
| 2020/0104257 | A1 | 4/2020 | Lee et al. | |
| 2020/0349149 | A1 | 11/2020 | Wang et al. | |

(Continued)

OTHER PUBLICATIONS

Non-Final Office Action mailed on May 9, 2023 for U.S. Appl. No. 17/728,441, filed Apr. 25, 2022, 7 pages.

(Continued)

*Primary Examiner* — Mark A Giardino, Jr.
(74) *Attorney, Agent, or Firm* — Cooper Legal Group, LLC (57) ABSTRACT

Techniques are provided for journal replay optimization. A distributed storage architecture can implement a journal within memory for logging write operations into log records. Latency of executing the write operations is improved because the write operations can be responded back to clients as complete once logged within the journal without having to store the data to higher latency disk storage. If there is a failure, then a replay process is performed to replay the write operations logged within the journal in order to bring a file system up-to-date. The time to complete the replay of the write operations is significantly reduced by caching metadata (e.g., indirect blocks, checksums, buftree identifiers, file block numbers, and consistency point counts) directly into log records. Replay can quickly access this metadata for replaying the write operations because the metadata does not need to be retrieved from the higher latency disk storage into memory.

20 Claims, 8 Drawing Sheets

(56) References Cited

U.S. PATENT DOCUMENTS

2022/0114087 A1     4/2022   Kim et al.
2023/0342053 A1   10/2023   Varghese et al.

OTHER PUBLICATIONS

Notice of Allowance mailed on Aug. 25, 2023 for U.S. Appl. No. 17/728,441, filed Apr. 25, 2022, 8 pages.
Notice of Allowance mailed on Nov. 24, 2023 for U.S. Appl. No. 17/728,441, filed Apr. 25, 2022, 2 pages.
Yuan J., et al., "Optimizing Every Operation in a Write-optimized File System," Usenix, 2016, 15 pages.
Zha D., et al., "Experience Replay Optimization." Department of Computer Science and Engineering, Texas AM University, 2019; 7 pages.
Zhang X., et al., "Optimizing File Systems with a Write-efficient Journaling Scheme on Non-volatile Memory," IEEE Transactions on Computers, 2018, 12 pages.

\* cited by examiner

JOURNAL REPLAY OPTIMIZATION

RELATED APPLICATIONS

This application claims priority to and is a continuation of U.S. Patent Application, titled "JOURNAL REPLAY OPTIMIZATION", filed on Apr. 25, 2022 and accorded Application Ser. No. 17/728,441, which is incorporated herein by reference.

TECHNICAL FIELD

Various embodiments of the present technology relate to journaling write operations into a journal. More specifically, some embodiments relate to caching metadata into log records of a journal for subsequent use during journal replay.

BACKGROUND

A storage architecture may store data for clients within disk storage. When executing a write operation from a client to write data to the disk storage, there is latency involved with accessing the disk storage. In order to reduce this latency and improve client performance, the storage architecture can implement journaling. With journaling, write operations from the client are logged into a journal. The journal may be stored within memory or other relatively faster storage compared to the disk storage. This improves client performance and reduces latency because the write operations can be quickly responded back to the client as successful once the write operations are logged. These success responses can be sent back to the client without waiting for the write operations to write data to the slower disk storage, which would otherwise increase latency of executing the write operations and responding back to the client. Over time, the journal is filled with log records of write operations logged into the journal. After a certain amount of time or when the journal is full or close to becoming full, a consistency point is performed. During the consistency point, the data of the write operations logged within the journal are stored to the disk storage. The consistency point is performed after the write operations were responded back to the clients, and thus the consistency point does not affect client latency or performance.

DESCRIPTION OF THE DRAWINGS

Embodiments of the present technology will be described and explained through the use of the accompanying drawings in which.

The drawings have not necessarily been drawn to scale. Similarly, some components and/or operations may be separated into different blocks or combined into a single block for the purposes of discussion of some embodiments of the present technology. Moreover, while the present technology is amenable to various modifications and alternative forms, specific embodiments have been shown by way of example in the drawings and are described in detail below. The intention, however, is not to limit the present technology to the particular embodiments described. On the contrary, the present technology is intended to cover all modifications, equivalents, and alternatives falling within the scope of the present technology as defined by the appended claims.

DETAILED DESCRIPTION

The techniques described herein are directed to journal replay optimization for a distributed storage architecture. The distributed storage architecture includes nodes that manage and provide clients with access to distributed storage. The distributed storage may be composed of storage devices local to each node. Data within the distributed storage may be organized into storage containers. A storage container may comprise a logical unit number (LUN). A LUN serves as an identifier for a certain amount of storage of the distributed storage. The LUN is used to provide clients with access to data within the distributed storage through a file system (e.g., a network file system). The nodes implement storage operating system instances that create and host volumes within the LUN. The storage operating system instances expose these volumes to clients for network file system access to data within the volumes. In this way, the distributed storage is exposed to clients through multiple nodes as LUNs that provide clients with network file system access to data through volumes.

A storage operating system instance of a node may utilize a portion of a LUN as a journal. In some embodiments, the journal may be maintained within relatively faster storage than disk storage, such as within memory. In some embodiments, the journal is implemented as a simulated non-volatile random-access memory (NVRAM) device that is block addressable where log records of the journal are stored within 4 kb blocks or any other fixed sized blocks. The journal is used to log metadata and data of write operations as the log records. For example, a write operation is received by the storage operating system instance from a client. The write operation is writing data to a file. The file is identified by an inode, and the location of where that data is being written is identified by a file block number. In this way, a log record is created within the journal to comprise the data and the metadata that includes the inode and the file block number. Once the log record is created, a response that the write operation has been successfully implemented is provided back to the client. Logging write operations to the journal in memory is faster than individually executing each write operation upon storage devices (disk storage) of the distributed storage before responded back to the clients, thus improving client performance and reducing latency of processing the write operations.

Over time, the journal is populated with the log records corresponding to changes by write operations that have been accumulated within the journal. Periodically, a consistency point is triggered to update a file system based upon the changes. During the consistency point, file system metadata (e.g., inodes, file block numbers, buftree identifiers of buftrees used to translate virtual volume block numbers into block address space of a LUN, etc.) and disk locations for the data (e.g., indirect blocks pointing to user blocks storing the actual data) are updated within the file system based upon the log records. As part of implementing the consistency point, the data portion of the log records (e.g., data being written by the write operations logged into the journal) are stored from the journal to physical storage (disk storage) used by the file system to persist data.

During the consistency point, read operations from clients are responded to with consistent data from the journal because this up-to-date consistent data is still within the journal in memory before being stored to the physical storage. If the storage operating system instance experiences a failure before the consistency point has completed, then the log records within the journal must be replayed in order to make the file system consistent. Replay must be performed to make the file system consistent before client I/O operations can be processed because the client I/O operations would either fail or return stale data. Thus, clients will be unable to access data within the distributed storage until the replay has successfully completed. Once the replay has successfully updated the file system and stored data within the log records to the physical storage, the client I/O operations can be processed.

Replay can result in prolonged client downtime where the clients are unable to access the data within the distributed storage. One reason why replay can take a substantial amount of time is that indirect blocks, pointing to physical disk locations of the user blocks comprising actual user data, must be loaded into memory from disk storage. The indirect blocks are loaded into memory during replay because write operations being replayed from log records within the journal may modify the indirect blocks so that the indirect blocks point to new disk locations of where the write operations are writing data. These indirect blocks may be part of a hierarchical structure (e.g., a file system tree) that includes a root node of a file system at the top, and then one or more levels of indirect blocks pointing to blocks within lower levels, and a lowest level of user blocks comprising actual user data. Loading the indirect blocks from disk storage to memory results in a lot of small disk I/O operations due to the small sizes of the indirect blocks (e.g., an indirect block may be comprised of a 4 kb block). Thus, a large number of small disk I/O operations must be performed to load the indirect blocks for the log records into memory (e.g., thousands of 4 kb indirect blocks), which increases the time to perform the replay and thus increasing client downtime. Furthermore, the disk locations of the indirect blocks is not yet known until the log records are being processed, and thus the indirect blocks cannot be prefetched into memory.

Various embodiments of the techniques provided herein reduce the time to perform the replay by directly caching indirect blocks within log records so that the indirect blocks do not need to be loaded from disk storage to memory during replay. Reducing the time to complete the replay reduces client downtime where client I/O is blocked until replay completes.

In some embodiments of caching indirect blocks into logs records of the journal, a write operation is received by a journal caching process from a client. The node evaluates the write operation to identify an indirect block of data targeted by the incoming write operation. The indirect block points to a disk location where the data will be written by the incoming write operation to the distributed storage. The journal caching process may use various criteria for determining whether and how to cache the indirect block. In some embodiments of using the criteria to determine whether to cache the indirect block, the journal caching process determines whether the indirect block is dirty or clean. The indirect block is clean if the indirect block has not already been cached within the journal, and thus there are no already logged write operations that will modify the indirect block. The indirect block is dirty if the indirect block has already been cached within a log record in the journal for a logged write operation that will modify the indirect block. In this scenario, the logged write operation and the incoming write operation target the same data pointed to by the indirect block. If the indirect block is dirty and already cached within the journal, then the indirect block is not re-cached with the incoming write operation into the journal. This is because the cached indirect block will be loaded into memory from the journal during a subsequent replay process and the cached indirect block only needs to be loaded into memory once. If the indirect block is clean and not already cached within the journal, then the indirect block is cached within free space of a log record within which metadata (e.g., an inode and a file block number of a file targeted by the incoming write operation) and data of the incoming write operation is being logged.

In some embodiments of using the criteria to determine how to cache the indirect block, a size of the free space within the log record is determined. In some embodiments, the log record is composed of a header block and one or more journal blocks. The metadata of the write operation is stored within the header block. The data being written by the write operation is stored within the one or more journal blocks. In some embodiments, the header block and the journal blocks are separated out into logical block addresses with fixed block sizes (e.g., each logical block address is 4096 bytes), which allows for block sharing of the log records with a consistency point process that stores the data within the journal blocks to physical storage during a consistency point. Some of those blocks may have free space that is not being consumed by the metadata and/or the data. In some embodiments, the metadata within the header block consumes 512 bytes, and thus there is 3.5 kb of free space remaining within the header block. If the size of the indirect block fits within free space of the header block or any of the journal blocks of the log record, then the indirect block is directly cached into the free space. If the size of the indirect block does not fit within the free space of the header block or any journal blocks, then the indirect block is modified to reduce the size of the indirect block so that the indirect block fits within the free space. The size of the indirect block can be compressed to a compressed size that fits within the free space and/or an unused portion of the indirect block may be removed from the indirect block to reduce the size of the indirect block to a size that fits within the free space. In this way, the indirect block is cached within the log record used to log the write operation.

Because the indirect blocks are directly cached within log records of the journal stored in memory, the indirect blocks do not need to be retrieved from disk storage into memory during replay. This greatly reduces the time of performing the replay, and thus reducing the client downtime where client I/O operations are blocked until the replay fully completes. Replay is performed after a failure in order to recover from the failure and bring a file system back into a consistent state. During replay, log records are used to generate file system messages that are executed to bring the file system back into the consistent state reflected by the write operations logged within the journal. The write operations may modify indirect blocks during replay. This process is performant and is accomplished with lower latency because the indirect blocks are already available in memory and do not need to be read from disk storage into the memory where the journal is maintained within the memory.

Various embodiments of the present technology provide for a wide range of technical effects, advantages, and/or improvements to computing systems and components. For example, various embodiments may include one or more of the following technical effects, advantages, and/or improvements: 1) caching indirect blocks associated with data modified by write operations into log records of a journal within which the write operations are logged; 2) selectively determining whether to cache indirect blocks based upon whether the indirect blocks are dirty (e.g., an indirect block already cached within the journal by another write operation targeting the indirect block) or clean (e.g., an indirect block not yet cached) so that indirect blocks are not redundantly cached within the journal; 3) modifying indirect blocks by removing unused portions of indirect blocks and/or by compressing the indirect blocks in order to reduce a size of the indirect blocks to fit within free space of log records; 4) caching a single instance of an indirect block within the journal in memory so that an first write operation modifying the indirect block and all subsequent write operations modifying the indirect can benefit from the indirect block being cached merely once within the memory used to host the journal; 5) reducing the time to perform a replay after a failure in order to bring a file system to a consistent state by utilizing already cached indirect blocks within memory without having the read the indirect blocks from slower disk storage into the faster memory; and/or 6) reducing client downtime where client I/O operations are blocked during the replay by reducing the time to perform the replay.

Figure 1A:
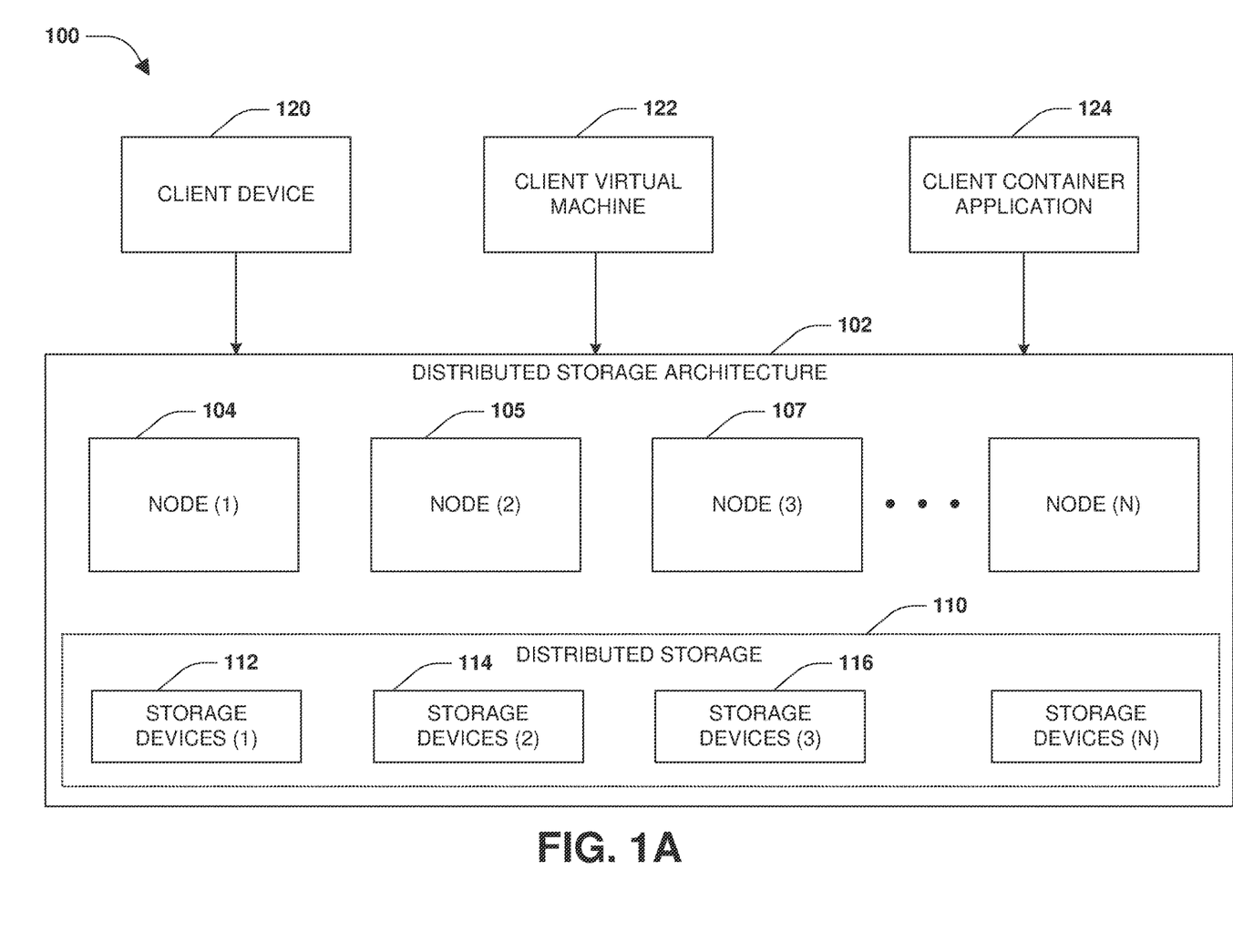
FIG. 1A is a block diagram illustrating an example of a distributed storage architecture of nodes in accordance with an embodiment of the present technology.

FIG. 1A is a block diagram illustrating an example of a distributed storage architecture 102 of nodes in accordance with an embodiment of the present technology. The distributed storage architecture 102 hosts a first node 104, a second node 105, a third node 107, and/or other nodes that manage distributed storage 110 accessible to the nodes. The distributed storage 110 is composed of storage devices that are accessible to the nodes. The distributed storage may be composed of storage devices 112 managed by the first node 104, storage devices 114 managed by the second node 105, storage devices 116 managed by the third node 107. The distributed storage architecture 102 may implement the nodes as servers, virtual machines, containers within a container orchestration platform (e.g., Kubernetes), serverless threads, etc. The nodes may provide various types of clients with access to the distributed storage. The nodes may provide a client device 120, a client virtual machine 122, a client container application (e.g., a file system service application hosted within a container of a container orchestration platform), and/or other types of clients with access to the distributed storage.

In some embodiments, a node may create a LUN within the distributed storage 110. The LUN may be comprised of storage located across one or more of the storage devices of the distributed storage 110. A storage operating system instance of the node may create volumes within the LUN. The storage operating system instance may provide clients with access to data stored within the volumes of the LUN through a network file system. In this way, the clients are provided within network file system access to the distributed storage 110. As will be discussed in further detail, the storage operating system instance may utilize a portion of the LUN as a simulated non-volatile random-access memory (NVRAM) device. The NVRAM device is used as a journal for logging write operations from the clients. When the node receives a write operation, the node may log the write operation into the journal as a log record. As write operations are accumulated within the journal as log records, a consistency point may be reached (e.g., a certain amount of time occurring since a prior consistency point, the journal reaching a certain number of log records, the journal becoming full or close to full, etc.). During the consistency point, the data of the write operations logged within the journal are stored to the distributed storage 110 (e.g., stored to final destinations within the distributed storage 110).

Figure 1B:
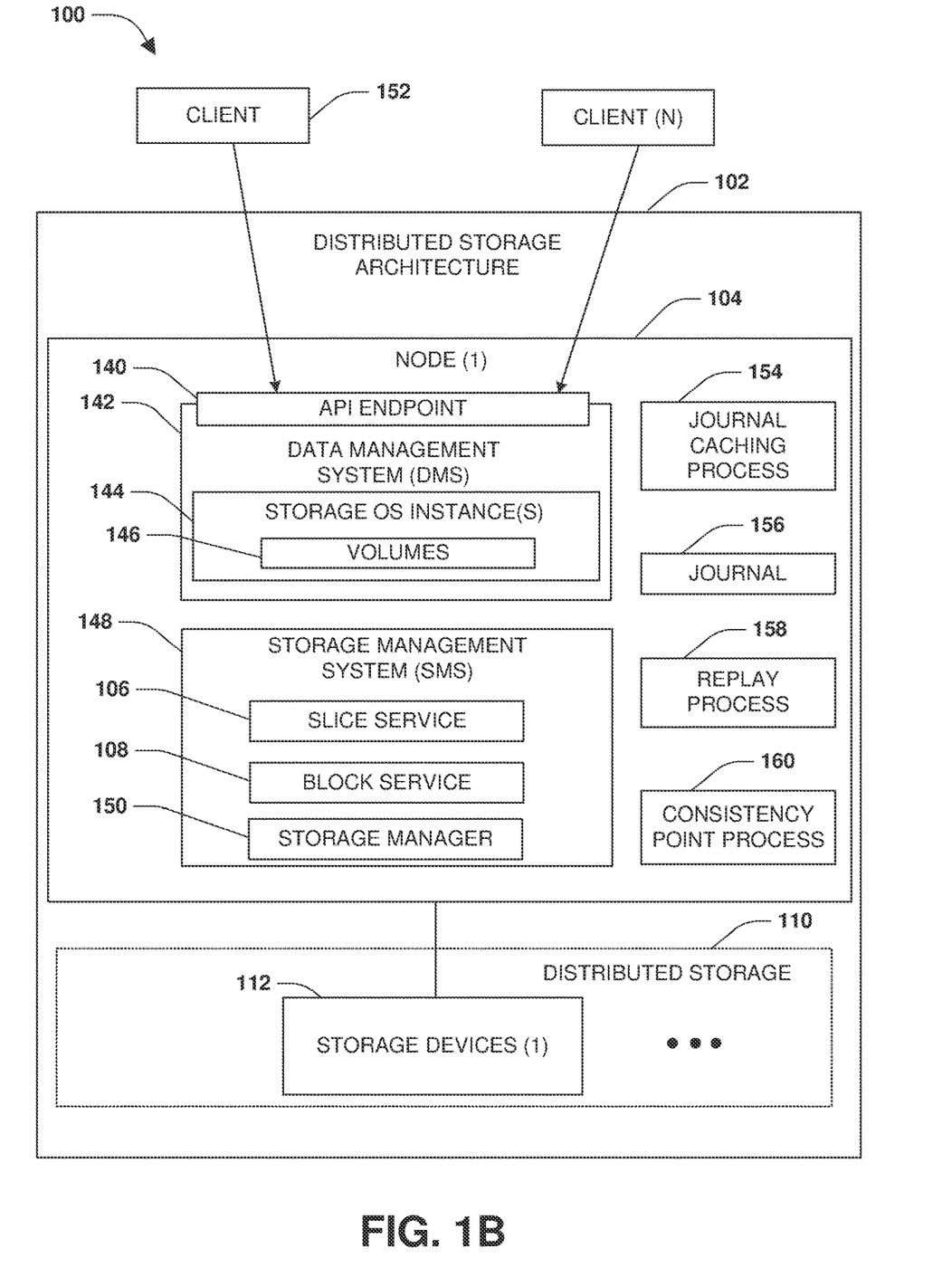
FIG. 1B is a block diagram illustrating an example of a node of a distributed storage architecture in accordance with an embodiment of the present technology.

FIG. 1B is a block diagram illustrating an example of the first node 104 of the distributed storage architecture 102 in accordance with an embodiment of the present technology. The first node 104 may comprise a data management system (DMS) 142 and a storage management system (SMS) 148. The data management system 142 is a client facing frontend, which allows clients (e.g., a client 152) to interact with the first node 104. The clients may interact with the data management system 142 through an API endpoint 140 configured to receive API commands from the clients, such as commands to access data stored within the distributed storage 110. The storage management system 148 is a distributed backend (e.g., instances of the storage management system 148 may be distributed amongst multiple nodes of the distributed storage architecture 102) used to store data on storage devices of the distributed storage 124.

The data management system 142 may host one or more storage operating system instances 144, such as a storage operating system instance accessible to the client 152 for storing data. In some embodiments, the first storage operating system instance may run on an operating system (e.g., Linux) as a process and may support various protocols, such as NFS, CIFS, and/or other file protocols through which clients may access files through the storage operating system instance. The storage operating system instance may provide an API layer through which applications may set configurations (e.g., a snapshot policy, an export policy, etc., settings (e.g., specifying a size or name for a volume), and transmit I/O operations directed to volumes 146 (e.g., FlexVols) exported to the clients by the storage operating system instance. In this way, the applications communicate with the storage operating system instance through this API layer. The data management system 142 may be specific to the first node 104 (e.g., as opposed to the storage management system (SMS) 148 that may be a distributed component amongst nodes of the distributed storage architecture 102). The storage operating system instance may comprise an operating system stack that includes a protocol layer (e.g., a layer implementing NFS, CIFS, etc.), a file system layer, a storage layer (e.g., a RAID layer), etc. The storage operating system instance may provide various techniques for communicating with storage, such as through ZAPI commands, REST API operations, etc. The storage operating system instance may be configured to communicate with the storage management system 148 through iSCSI, remote procedure calls (RPCs), etc. For example, the storage operating system instance may communicate with virtual disks provided by the storage management system 148 to the data management system 142, such as through iSCSI and/or RPC.

The storage management system 148 may be implemented by the first node 104 as a storage backend. The storage management system 148 may be implemented as a distributed component with instances that are hosted on each of the nodes of the distributed storage architecture 102. The storage management system 148 may host a control plane layer. The control plane layer may host a full operating system with a frontend and a backend storage system. The control plane layer may form a control plane that includes control plane services, such as the slice service 106 that manages slice files used as indirection layers for accessing data on storage devices of the distributed storage 110, the block service 108 that manages block storage of the data on the storage devices of the distributed storage 110, a transport service used to transport commands through a persistence abstraction layer to a storage manager 150, and/or other control plane services. The slice service 106 may be implemented as a metadata control plane and the block service 108 may be implemented as a data control plane. Because the storage management system 148 may be implemented as a distributed component, the slice service 106 and the block service 108 may communicate with one another on the first node 104 and/or may communicate (e.g., through remote procedure calls) with other instances of the slice service 106 and the block service 108 hosted at other nodes within the distributed storage architecture 102. In some embodiments, the first node 104 may be a current owner of an object (a volume) whose data is sliced/distributed across storage device of multiple nodes, and the first node 104 can use the storage management system 148 to access the data stored within the storage devices of the other nodes by communicating with the other instances of the storage management system.

In some embodiments of the slice service 106, the slice service 106 may utilize slices, such as slice files, as indirection layers. The first node 104 may provide the clients with access to a storage container such as a LUN or volume using the storage operating system instances 144 of the data management system 142. The LUN may have N logical blocks that may be 1 kb each. If one of the logical blocks is in use and storing data, then the logical block has a block identifier of a block storing the actual data. A slice file for the LUN (or volume) has mappings that map logical block numbers of the LUN (or volume) to block identifiers of the blocks storing the actual data. Each LUN or volume will have a slice file, so there may be hundreds of slices files that may be distributed amongst the nodes of the distributed storage architecture 102. A slice file may be replicated so that there is a primary slice file and one or more secondary slice files that are maintained as copies of the primary slice file. When write operations and delete operations are executed, corresponding mappings that are affected by these operations are updated within the primary slice file. The updates to the primary slice file are replicated to the one or more secondary slice files. After, the write or deletion operations are responded back to a client as successful. Also, read operations may be served from the primary slice since the primary slice may be the authoritative source of logical block to block identifier mappings.

In some embodiments, the control plane layer may not directly communicate with the distributed storage 124 but may instead communicate through the persistence abstraction layer to a storage manager 150 that manages the distributed storage 124. In some embodiments, the storage manager 150 may comprise storage operating system functionality running on an operating system (e.g., Linux). The storage operating system functionality of the storage manager 150 may run directly from internal APIs (e.g., as opposed to protocol access) received through the persistence abstraction layer. In some embodiments, the control plane layer may transmit I/O operations through the persistence abstraction layer to the storage manager 150 using the internal APIs. For example, the slice service 106 may transmit I/O operations through the persistence abstraction layer to a slice volume hosted by the storage manager 150 for the slice service 106. In this way, slice files and/or metadata may be stored within the slice volume exposed to the slice service 106 by the storage manager 150.

The first node 104 may implement a journal caching process 154 configured to perform journaling of write operations using a journal 156. In some embodiments, the journal caching process 154 may be hosted by the data management system 142 or the storage management system 148. The journal 156 may be stored within memory of the first node 104 as opposed to within the distributed storage 110 so that the journal caching process 154 can quickly access the journal 156 at lower latencies than accessing the distributed storage 110. When write operations are received by the first node 104, the write operations are initially logged within the journal 156 as log records. These write operations may target data organized within a file system. Once a write operation is logged into the journal 156, a success response for the write operation can be quickly provided back to the client. The success response is returned much quicker than if the success response was returned to the client after executing the write operation to store data to the slower storage devices of the distributed storage 110. Thus, client performance is improved and write operation execution latency is reduced by logging the write operations into the journal 156.

As part of logging the write operation, the journal caching process 154 evaluates the write operation to identify an indirect block of data targeted by the incoming write operation. In particular, the incoming write operation may target a file system that is organized according to a hierarchical tree structure. At the top of the hierarchical tree structure is a root node. A lowest level (level L0) of the hierarchical tree structure comprises user blocks (L0 blocks) within which user data is stored. The hierarchical tree structure may comprise one or more intermediary levels between the root node and the lowest level (level L0) of user blocks. The one or more intermediary levels are used as indirection layers that comprise indirect blocks pointing to blocks in lower levels of the hierarchical tree structure. In some embodiments, indirect blocks (L1 blocks) within a level (level L1) directly above the lowest level (level L0) of user blocks comprises indirect blocks (L1 blocks) pointing to the user blocks. A level (level L2) directly above the level (Level L1) of indirect blocks may also comprise indirect blocks (L2 blocks) that point to the indirect blocks (L1 blocks) of the level (level L1). In this way, the root node and the indirect blocks within the intermediary levels of the hierarchical tree structure can be used to traverse down through the hierarchical tree structure to identify and access user data within the user blocks. In some embodiments, an indirect block comprises a pointer to another block. The pointer may comprise a physical volume block number and virtual volume block number used to access the block.

If the indirect block has not already been cached within the journal 156 (e.g., the indirect block is clean), then the journal caching process 154 caches the indirect block within the log record within which the write operation is logged.

Otherwise, if the indirect block has already been cached within the journal 156 (e.g., the indirect block is dirty), then the journal caching process 154 does not cache the indirect block within the log record. Once the write operation and/or the indirect block has been cached within the log record, then a response is provided back to the client that the write operation was successfully performed. Responding back to the client after merely logging the write operation and caching the indirect block significantly reduces a timespan that the client would have to wait for a response if the response was otherwise provided only after the write operation was executed to disk storage, which would increases latency of the write operation due to the higher latency of disk storage. A subsequently journal replay operation of the log record will be faster because the indirect block is already cached within the log record in memory and will not need to be read from the higher latency disk storage into memory because the log record is already stored within the memory.

Periodically or based upon various triggers, a consistency point process 160 is implemented to perform consistency points to store data of the logged write operations from the log records in the journal 156 to the distributed storage 110. The consistent point process 160 may trigger a consistency point based upon the journal 156 having a threshold number of log records, the journal 156 becoming full or a threshold amount full (e.g., 85% of memory assigned to the journal 156 has been consumed), a threshold amount of time occurring since a prior consistency point, etc. The consistency point process 160 may update file system metadata of a file system and assign disk locations for the data being stored to the storage devices of the distributed storage 110.

If there is a failure within the distributed storage architecture 102 (e.g., a failure of the first node 104 or a different node such that the first node 104 is to take over for the failed node), then a replay process 158 is initiated as part of recovering from the failure. The replay process 158 may be triggered based upon a determination that the failure occurred during the consistency point process 160. Because the consistency point process 160 did not fully complete in this scenario, the replay process 158 is performed to bring the file system into a consistent state. During the replay process 158, log records are used to generate file system messages that are executed to bring the file system into the consistent state. The replay process 158 can be performed more quickly and efficiently because the indirect blocks are cached within the log records in the journal 156 that is stored within the relatively faster and lower latency memory compared to having to retrieve the indirect blocks from the slower and higher latency storage devices 112 of the distributed storage 110 into the memory. The indirect blocks are needed by the replay process 158 because logged write operations may modify the indirect blocks (e.g., a write operation may update an indirect block for data to point to a new disk location where the write operation is writing the data). A replay consistency point may be performed to store the data within the log records to the distributed storage 110.

Figure 2:
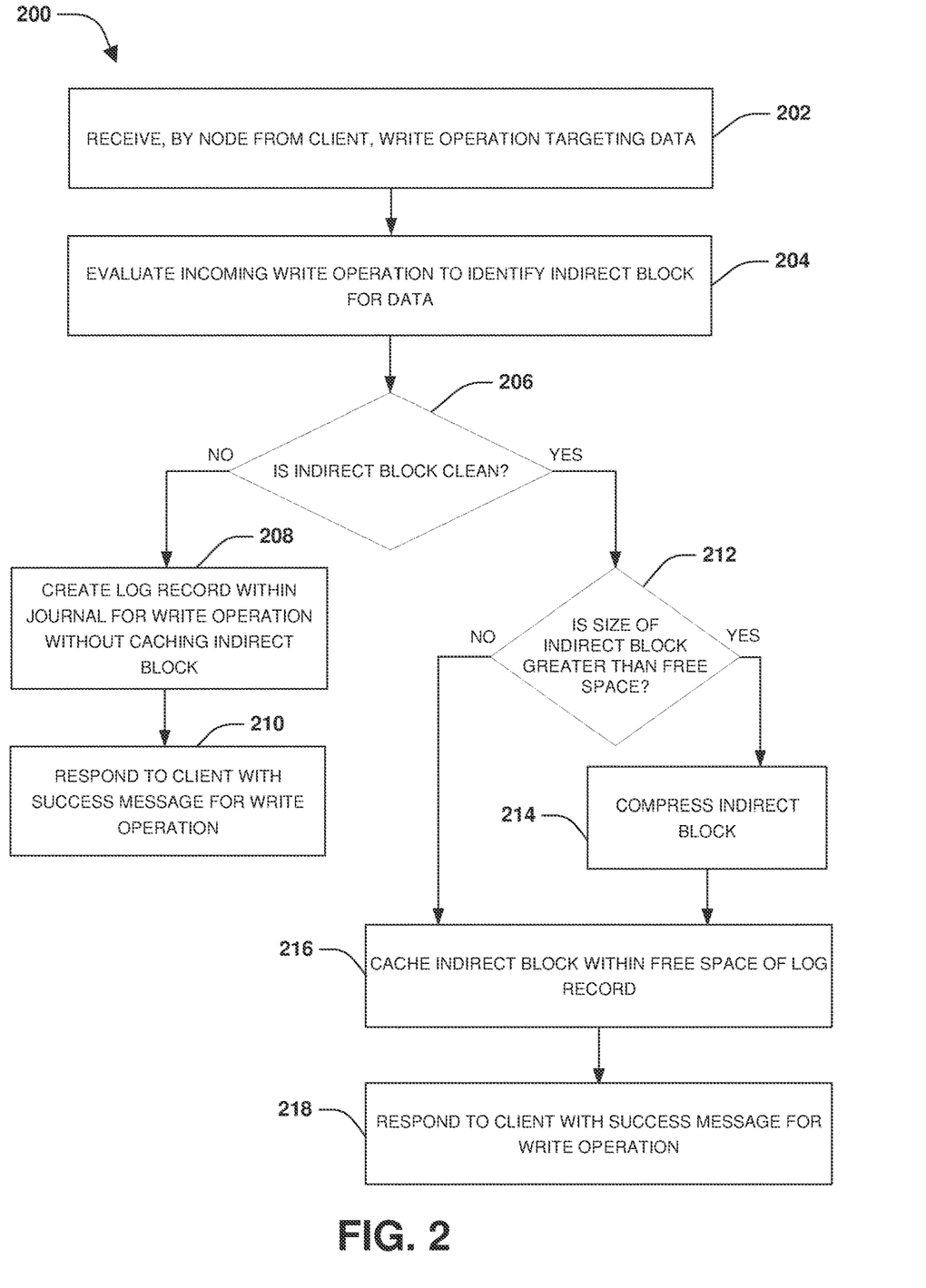
FIG. 2 is a flow chart illustrating an example set of operations for caching indirect blocks into log records of a journal in accordance with various embodiments of the present technology.

FIG. 2 is a flow chart illustrating an example of a set of operations for caching indirect blocks into log records of the journal 156 in accordance with various embodiments of the present technology. This example is discussed in conjunction with FIG. 3 that shows a block diagram illustrating an example of caching indirect blocks into log records of the journal 156 in accordance with an embodiment of the present technology. During operation 202 of method 200, the first node 104 may receive an incoming write operation 304 from a client device 302. In some embodiments, the incoming write operation 304 may be received by the data management system 142 for processing by a storage operating system instance based upon the incoming write operation 304 targeting one of the volumes 146. The incoming write operation 304 may be an operation to write a block of data to a particular file stored within the distributed storage 110 on behalf of the client device 302. The incoming write operation 304 may include the data being written to the file, an inode of the file, and offset at which the data is being written.

Figure 3:
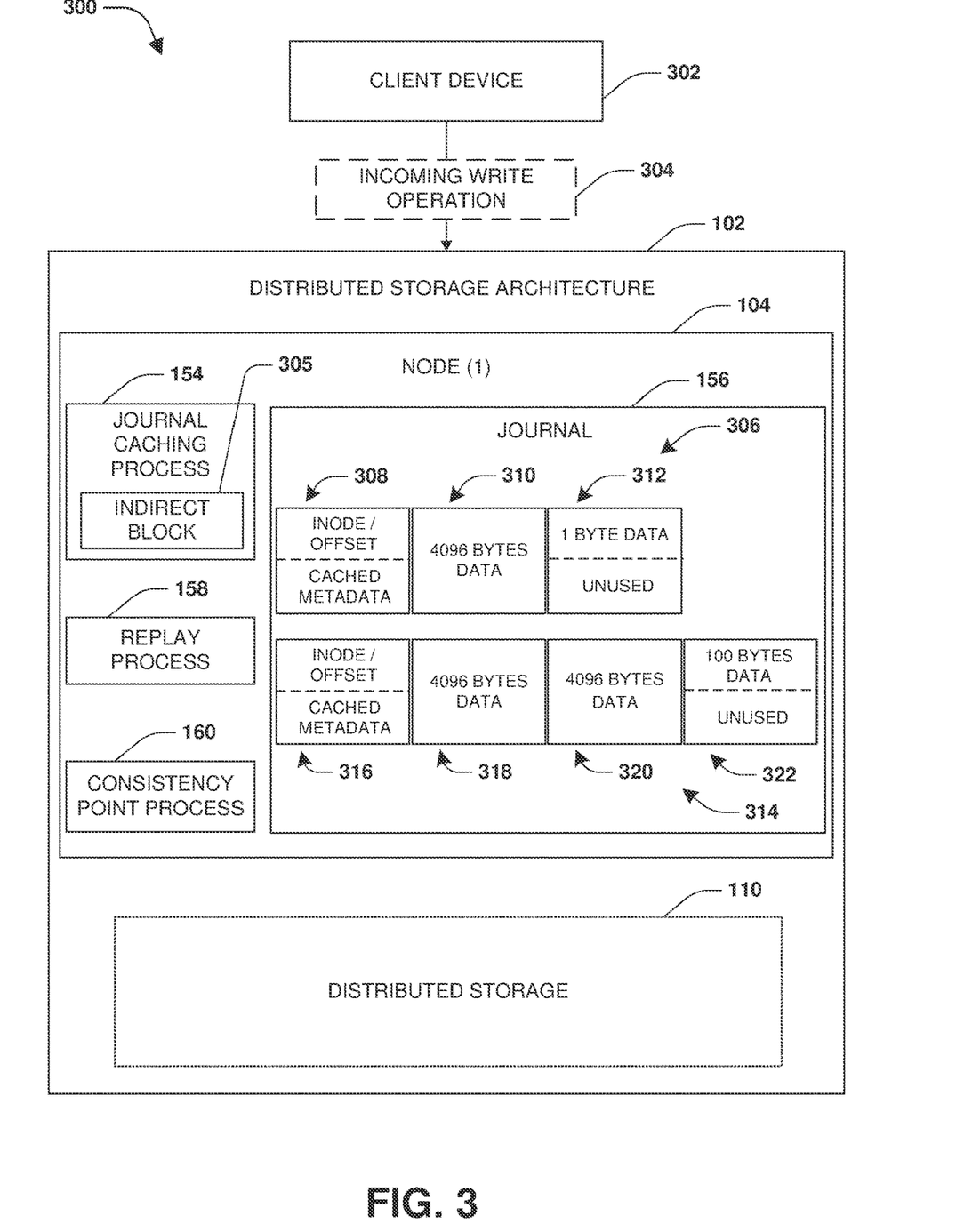
FIG. 3 is a block diagram illustrating an example of caching indirect blocks into log records of a journal in accordance with an embodiment of the present technology.

A log record 306 may be created within the journal 156 for logging the incoming write operation 304 into the journal 156. The log record 306 may be comprised of one or more blocks. The blocks may have a fixed size (e.g., 4 kb aligned blocks) that is also used by the consistency point process 160 so that the consistency point process 160 can share the blocks within the journal 156 while performing a consistency point. In some embodiments, the log record 306 used to log the incoming write operation 304 comprises a header block 308. The inode of the file and the offset at which the data is being written by the incoming write operation 304 is stored within the header block 308. In some embodiments, the inode and offset may consume less than the entire size of the header block 308, such as 200 bytes of the 4 kb header block. This leaves free space within the header block 308. The log record 306 comprises one or more journal blocks used to store data of the incoming write operation 304. The incoming write operation 304 may be writing data that is stored into the entire 4096 bytes of a first journal block 310 and 1 byte of a second journal block 312 with the remaining portion of the second journal block 312 having unused free space.

During operation 204 of method 200, the incoming write operation 304 may be evaluated by the journal caching process 154 to identify an indirect block 305 of the data targeted by (being written by) the incoming write operation 304. In some embodiments, the incoming write operation 304 is received at the API endpoint 140 and is routed by the data management system 142 to the journal caching process 154. The incoming write operation 304 comprises a payload of what data is being written and specifies where the data is to be written (e.g., writing data to a particular user block of a file that is pointed to by the indirect block 305). In this way, the indirect block 305 can be identified by the journal caching process 154 by evaluating the information within the incoming write operation 304 that specifies where the data is to be written. The indirect block 305 may comprise a pointer used to locate the data targeted by the incoming write operation 304. The indirect block 305 may specify a physical disk location of the data within a storage device of the distributed storage 110. The journal caching process 154 may determine whether and how to cache the indirect block 305 into the log record 306. In some embodiments of determining whether the cache the indirect block 305, the indirect block 305 is evaluated to determine whether the indirect block 305 is clean or dirty, during operation 206 of method 200. In some embodiments, the indirect block 305 is clean if the indirect block 305 is not already cached within the journal 156, thus indicating that there are no logged write operations targeting the data pointed to by the indirect block 305. In some embodiments, the indirect block 305 is clean if the indirect block points to a user block for which there are no logged write operations that are to write to that user block. In some embodiments, the indirect block 305 is clean if there are no logged write operations that will modify the indirect block 305, utilize the indirect block 305, and/or comprise information identifying the indirect block 305 and/or the user block pointed to by the indirect block 305.

The indirect block 305 is dirty if the indirect block 305 is already cached within the journal 156, thus indicating that there is at least one logged write operation targeting the data pointed to by the indirect block 305.

If the indirect block 305 is dirty (e.g., the indirect block 305 is already cached within the journal 156), then the indirect block 305 is not cached within the log record 306 because the indirect block 305 is already cached within the journal 156. Instead of re-caching a duplicate of the indirect block 305, the log record 306 is created without the indirect block 305 and is stored within the journal 156 in order to log the incoming write operation 304, during operation 208 of method 200. During operation 210 of method 200, a response is returned to the client device 302 to indicate that the incoming write operation 304 was successful. The response is returned based upon the incoming write operation 304 being logged into the journal 156 using the log record 306.

If the indirect block 305 is clean and not dirty, then a determination is made as to whether a size of the indirect block 305 is greater than free space within each of the blocks (e.g., the 4 kb fixed size header and journal blocks) of the log record 306 (e.g., free space within the header block 308 or free space within the second journal block 312), during operation 212 of method 200. Free space within the header block 308 may be known because the header block 308 has a fixed size (e.g., 4 kb) and the size of the inode and offset within the header block may be known (e.g., 200 bytes), thus leaving the remaining portion of the header block 308 as free space. In some embodiments, if the header block 308 has sufficient free space, then the header block is used. If the header block 308 has insufficient free space, then each journal block is evaluated until a journal block with sufficient free space is found and is used. If the header block 308 and all journal blocks do not have sufficient free space, then a new journal block is created within the log record 306 to store the indirect block 305. If the size of indirect block 305 is not greater than the free space within a block of the log record 306 (e.g., the header block 308, the second journal block 312, etc.), then the indirect block 305 is cached within the free space, during operation 216 of method 200. In some embodiments, the indirect block 305 is cached as cached metadata within the header block 308. It may be appreciated that the indirect block 305 may be cached elsewhere within the log record 306 (e.g., within the second journal block 312, within a newly created third journal block created to store the indirect block 305, etc.). In some embodiments, an indicator (e.g., one or more bits, a flag, etc.) may be stored with the indirect block 305 (e.g., just before a starting location of the indirect block 305) within the log record 306 to indicate that the subsequent data following the indicator is the indirect block 305. In some embodiments, if there is data stored after the 200 bytes of the inode and offset stored within the header block 308, then that data will be assumed to be the indirect block 305.

During operation 218 of method 200, the response with the success message for the incoming write operation 304 is provided back to the client device 302. Because the journal 156 may be stored within memory by the first node 104, the indirect block 305 may be quickly accessed from the journal 156 without having the read the indirect block 305 from the distributed storage 110 (disk storage) into the memory.

If the size of the indirect block 305 is greater than the free space of each block of the log record 306, then the indirect block 305 may be compressed to reduce the size of the indirect block 305 to a size smaller than the free space of at least one block within the log record 306, during operation 214 of method 200. In some embodiments of compressing the indirect block 305, a particular compression algorithm capable of compressing the indirect block 305 to the size smaller than the free space may be selected and used to compress the indirect block 305 so that the indirect block 305 fits within the free space of a block within the log record 306 (e.g., the header block 308). In some embodiments of compressing the indirect block 305, the indirect block 305 may be evaluated to identify a portion of the indirect block 305 to remove. The portion may correspond to an unused portion of the indirect block 305 or a portion of the indirect block 305 storing other data than the pointer to the data (the disk location of the data) targeted by the incoming write operation 304. The portion is removed from the indirect block 305 to reduce the size of the indirect block 305 so that the indirect block 305 can fit within the free space. In some embodiments, the indirect block 305 may have 1024 bytes of spare space (e.g., known zeros), which may be removed by a compression technique that removes/eliminates known zeros. In some embodiments, if compression will not reduce the size of the indirect block 305 to fit within the free space, then a new journal block may be created within the log record 306 for storing the indirect block 305 (e.g., a new 4 kb journal block to store the 4 kb indirect block 305).

Once the indirect block 305 has been compressed, the indirect block 305 is cached within the free space of the log record 306, during operation 216 of method 200. In some embodiments, the indirect block 305 is cached as the cached metadata within the header block 308. It may be appreciated that the indirect block 305 may be cached elsewhere within the log record 306. In some embodiments, if the compressed size of the indirect block 305 does not fit into the free space (e.g., free space of the header block 308), then the indirect block 305 (e.g., uncompressed or compressed) is inserted elsewhere within the log record 306 (e.g., appended to an end of the log record 306). During operation 218 method 200, the response with the success message for the incoming write operation 304 is provided back to the client device 302.

Other information may be cached as the cached metadata within the log record 306. In some embodiments, a raid checksum may be stored into the cached metadata within the log record 306. The raid checksum can be subsequently used by a process (e.g., the replay process 158 and/or the consistency point process 160) to verify the indirect block 305. If the raid checksum within the cached metadata does not match a raid checksum calculated for the indirect block 305, then the indirect block 305 within the log record 306 is determined to be corrupt and the indirect block will be read from the distributed storage 110 into the memory for use by the process. If the raid checksums match, then the indirect block 305 within the log record 306 is determined to be valid and can be used by the process. In some embodiments, context information may be stored as the cached metadata within the log record 306. The context information may comprise a buftree identifier (e.g., an identifier of a buftree comprising indirect blocks of the file targeted by the incoming write operation 304), a file block number of the file, and/or a consistency point count (e.g., a current count of consistency points performed by the consistency point process 160). The context information can be subsequently used by a process (e.g., the replay process 158 and/or the consistency point process 160) to determine whether the indirect block 305 within the log record 306 is corrupt or not and/or whether the indirect block is pointing the file system to the correct data in the distributed storage 110.

Other log records may be stored within the journal 156. In some embodiments, the journal 156 comprises a second log record 314 for a write operation. A header block 316 of the second log record 314 comprises an inode and offset of a file being modified by the write operation. The header block 316 may comprise cached metadata for the write operation. The cached metadata may comprise context information, a raid checksum, and/or an indirect block of data being written by the write operation. The data being written by the write operation may be stored within a first journal block 318, a second journal block 320, and a third journal block 322. In this way, write operations are logged into the journal 156 as log records within which metadata may also be cached. When a consistency point is triggered, the consistency point process 160 stores the data from the log records into the distributed storage 110, which may involve modifying cached indirect blocks within the log records based upon the write operations logged into the journal 156.

Figure 4:
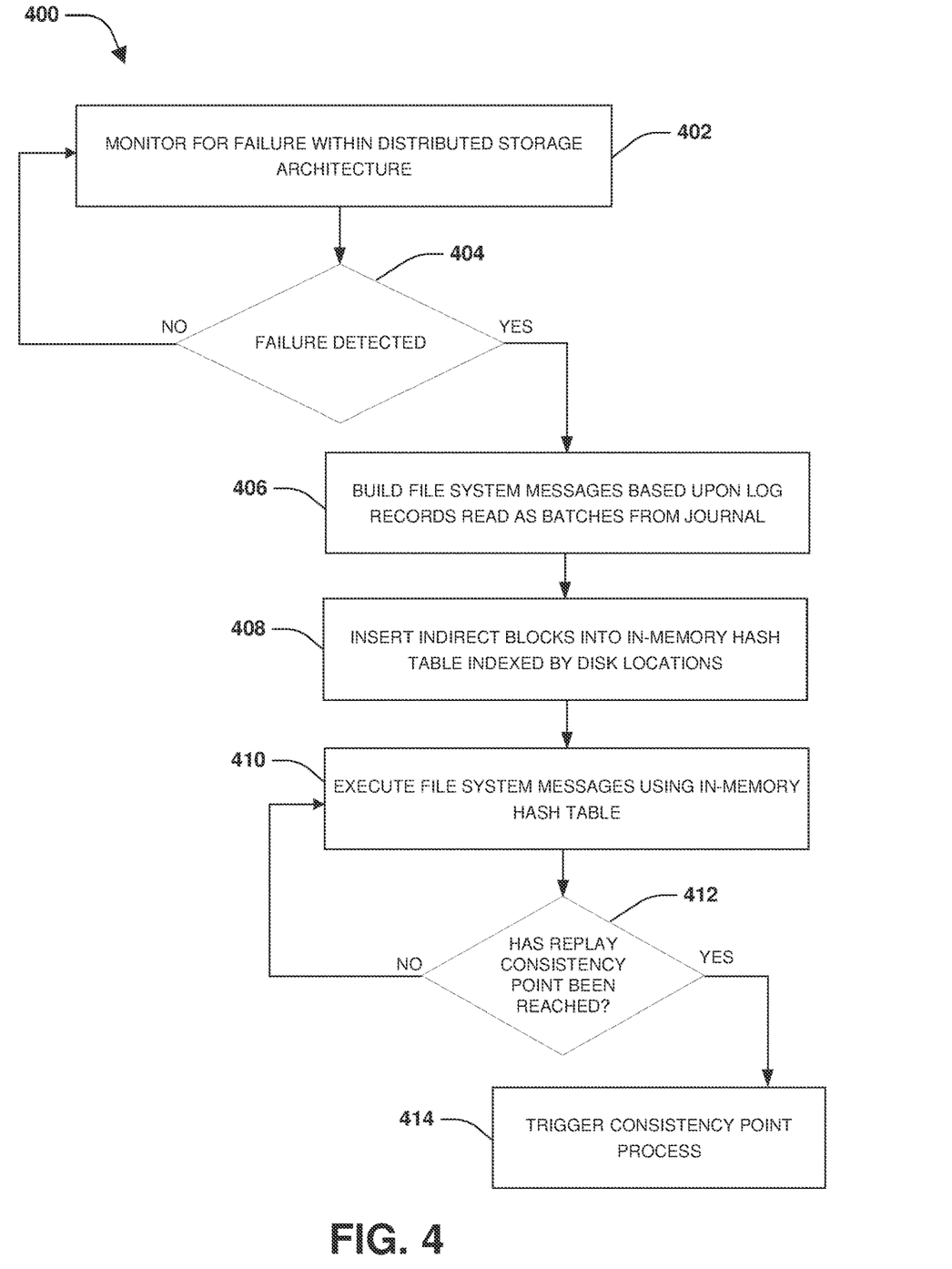
FIG. 4 is a flow chart illustrating an example set of operations for performing a replay process in accordance with various embodiments of the present technology.

FIG. 4 is a flow diagram illustrating an example of a set of operations for performing the replay process 158 in accordance with various embodiments of the present technology. This example is discussed in conjunction with FIGS. 5A and 5B that show block diagrams illustrating examples of performing the replay process 158 in accordance with an embodiment of the present technology. During operation 402 of method 400, the distributed storage architecture 102 is monitored for a failure. In some embodiments, heartbeat communication may be exchanged between nodes. If a node does not receive heart communication from another node, then the node may determine that the other node experienced a failure. In some embodiments, the distributed storage architecture 102 may monitor operational states of nodes to determine whether the nodes are operational or have experienced failures. It may be appreciated that a variety of other failure detection mechanisms may be implemented. During operation 404 of method 400, a determination is made as to whether a failure has been detected. If no failures have been detected, then monitoring of the distributed storage architecture 102 for failures continues. If a failure is detected, then the replay process 158 is performed as part of recovering from the failure. In some embodiments, the first node 104 implements the replay process 158 to replay write operations logged within log records 502 of the journal 156 to bring a file system 508 into a consistent state.

Figure 5A:
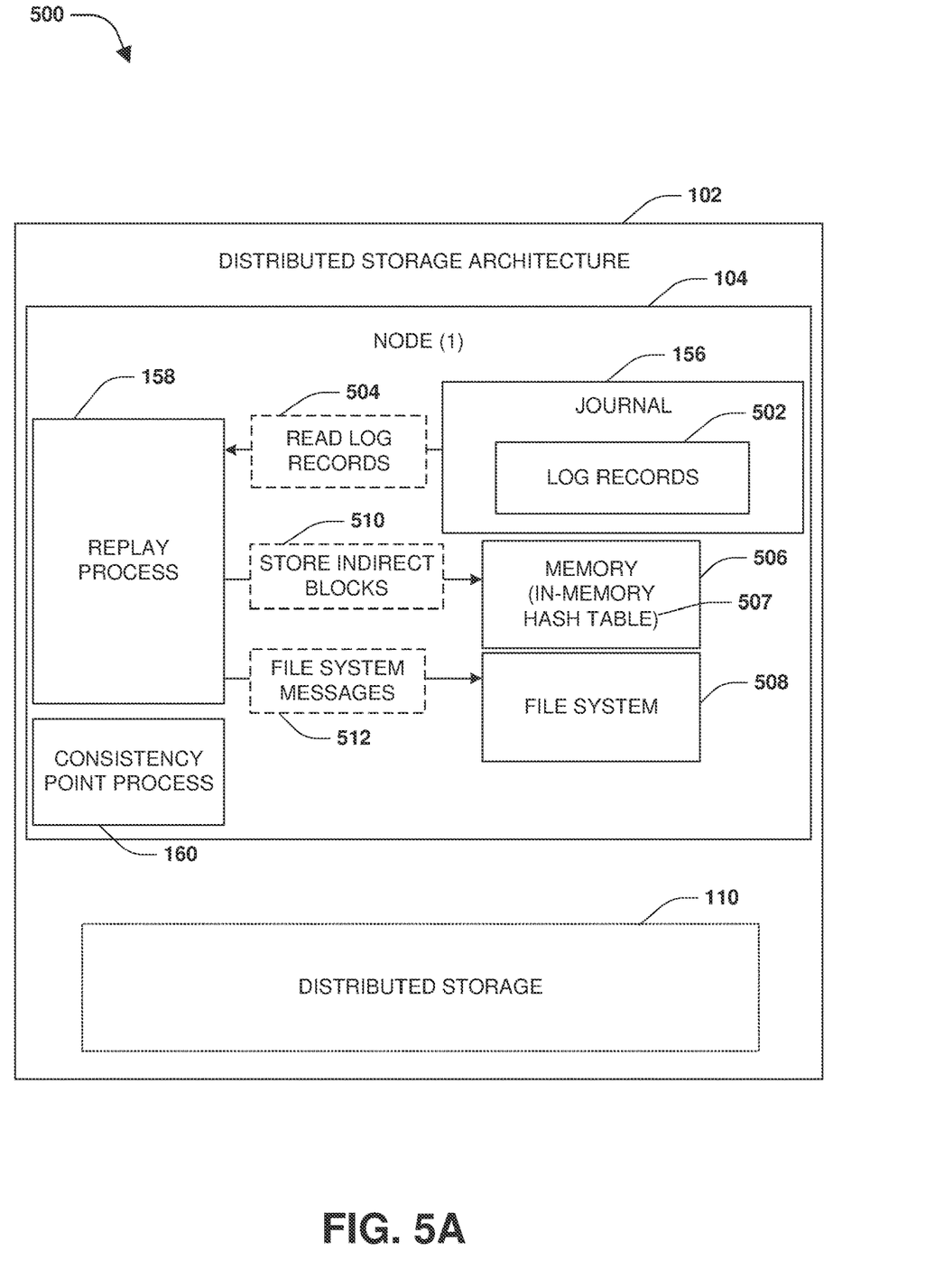
FIG. 5A is a block diagram illustrating an example of performing a replay process in accordance with an embodiment of the present technology.

As part of implementing the replay process 158, the replay process 158 sequentially reads 504 batches of the log records 502 from the journal 156. The replay process 158 builds file system messages 512 based upon the log records 502, during operation 406 of method 400. The file system messages 512 are used to bring the file system 508 into the consistent state after the failure. The file system 508 could be in an inconsistent state if a consistency point was in progress by the consistency point process 160 during the failure. The replay process 158 identifies indirect blocks and/or other metadata that was cached within the log records 502. During operation 408 of method 400, the replay process stores 510 the indirect blocks from the log records 502 into an in-memory hash table 507 indexed by disk locations identified by the indirect blocks. The in-memory hash table 507 may be maintained within memory 506 of the first node 104.

In some embodiments, various verifications may be performed upon the indirect blocks cached within the log records 502 to determine whether the indirect blocks are valid or corrupt. In some embodiments, raid checksums for the indirect blocks were cached within the log records 502. The raid checksums may be compared to raid checksums calculated for the indirect blocks (e.g., calculated during the replay process 158). If the raid checksums match for an indirect block, then the indirect block is valid and is stored within the in-memory hash table 507. If the raid checksums do not match, then the indirect block is determined to be corrupt and is not stored into the in-memory hash table 507. Instead, the indirect block is read from the distributed storage 110 into the in-memory hash table 507. In some embodiment, context information (e.g., a buftree identifier, a file block number, a consistency point count, etc.) may be used to determine whether the indirect block is not corrupt and is pointing the file system 508 to the correct data within the distributed storage 110. If the indirect block points to data that does not match the context information, then the indirect block may be corrupt and is not stored into the in-memory hash table 507. Instead, the indirect block is read from the distributed storage 110 into the in-memory hash table 507. Otherwise, if the data pointed to by the indirect block matches the context information, then the indirect block is stored 510 into the in-memory hash table 507.

During operation 410 of method 400, the replay process 158 executes the file system messages 512 to update the file system 508 to a consistent state. Some of the file system messages 512 may relate to write operations that utilize and/or modify the indirect blocks within the in-memory hash table 507, and thus the file system messages 512 utilize the in-memory hash table 507 during execution. Because only a single instance of an indirect block is cached within the log records 502, that single instance of the indirect block is stored 510 into the in-memory hash table 507, which may be accessed and/or modified by multiple file system messages derived from write operations targeting the data pointed to by the indirect block. This also may improve the efficiency of the replay process 158 because multiple file system messages (write operations) can benefit from a single instance of an indirect block being cached within the in-memory hash table 508.

Figure 5B:
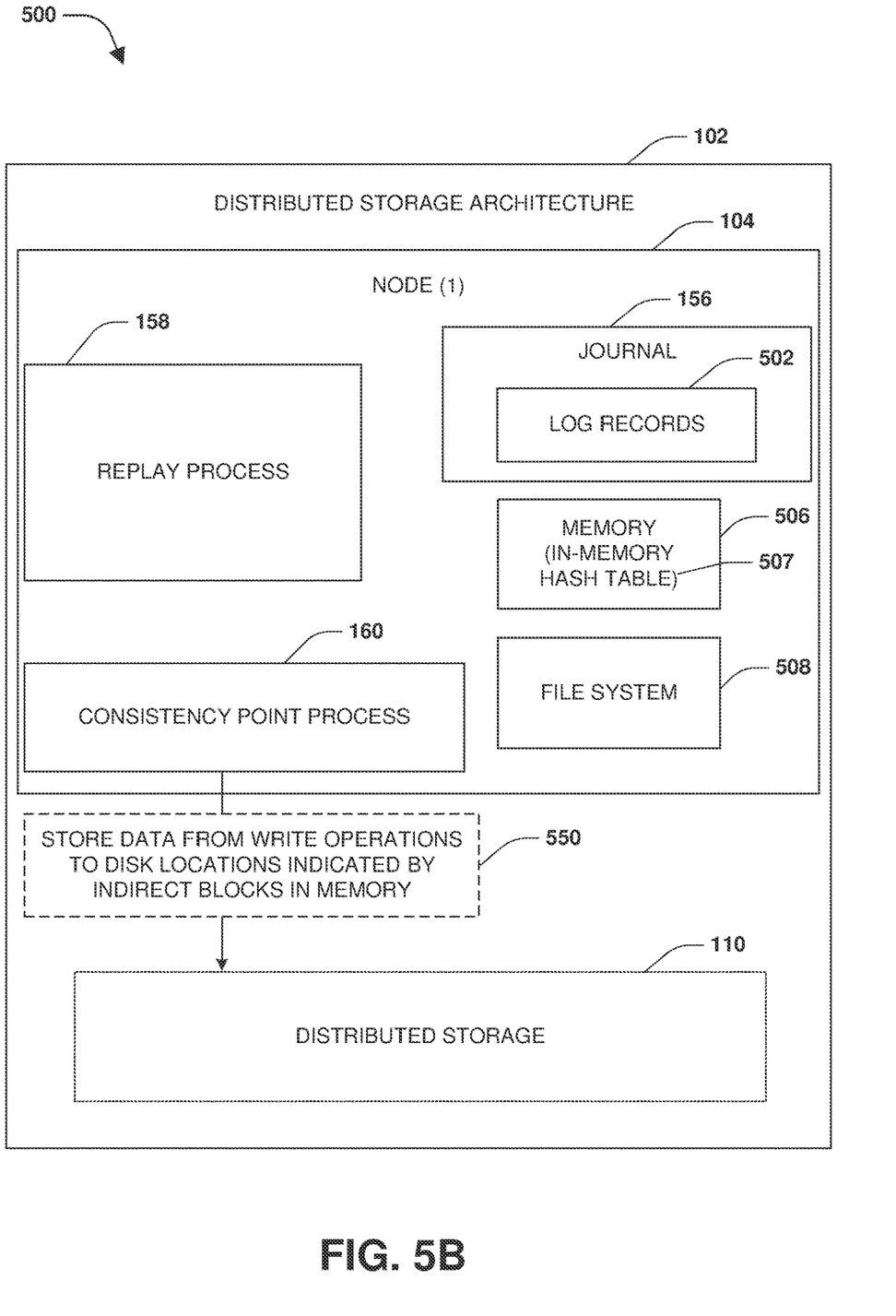
FIG. 5B is a block diagram illustrating an example of performing a replay consistency point during a replay process in accordance with an embodiment of the present technology.

During operation 412 of method 400, a determination may be made as to whether a consistency point has been reached (e.g., a threshold amount of time since a last consistency point, a certain number of file system messages being executed, etc.), as illustrated by FIG. 5B. If the replay consistency point has not been reached, then the file system messages may continue to be executed. If the replay consistency point has been reached, then the consistency point process 160 is triggered to store 550 data (e.g., data being written by the write operations used to build the file system messages 502) to disk locations indicated by the indirect blocks within the in-memory hash table 507 in the memory 506 of the first node 104, during operation 414 of method 400. In this way, the replay process 158 and the consistency point process 160 are utilized to bring the file system 508 into a consistent state and to store the data from the log records to the distributed storage 110.

Figure 6:
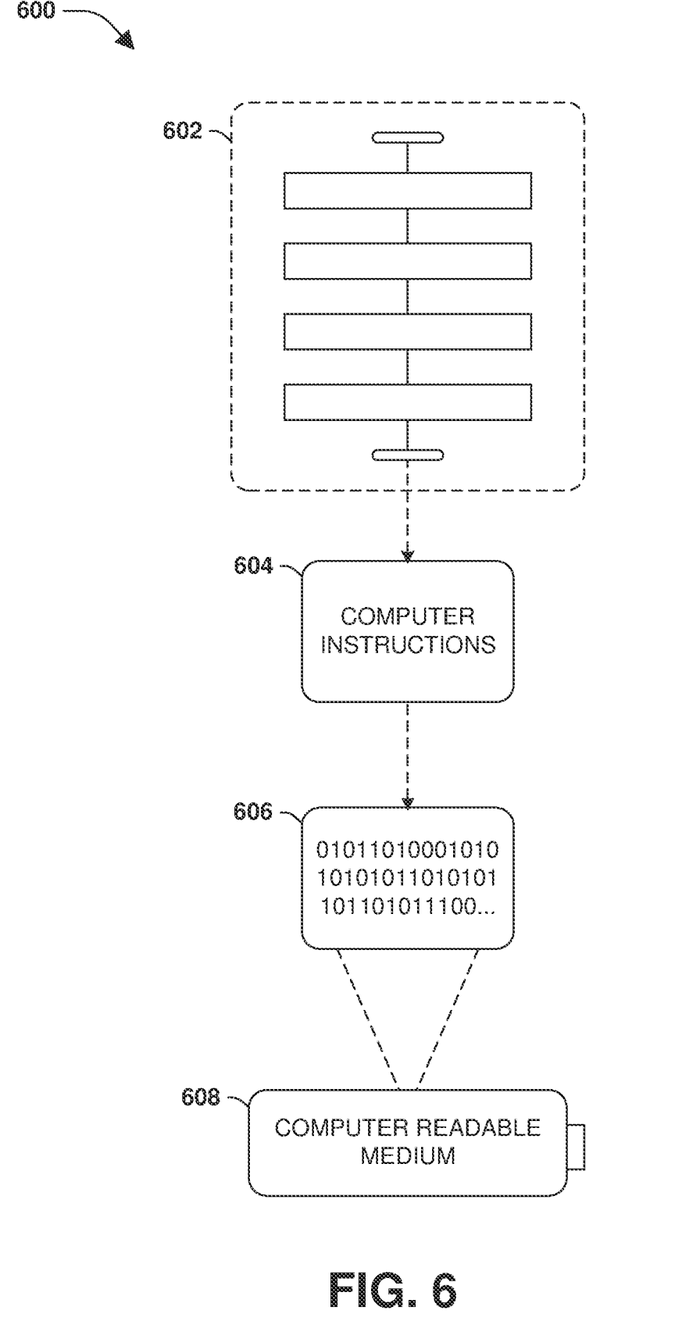
FIG. 6 is an example of a computer readable medium in which various embodiments of the present technology may be implemented.

FIG. 6 is an example of a computer readable medium 600 in which various embodiments of the present technology may be implemented. An example embodiment of a computer-readable medium or a computer-readable device that is devised in these ways is illustrated in FIG. 6, wherein the implementation comprises a computer-readable medium 608, such as a compact disc-recordable (CD-R), a digital versatile disc-recordable (DVD-R), flash drive, a platter of a hard disk drive, etc., on which is encoded computer-readable data 606. This computer-readable data 606, such as binary data comprising at least one of a zero or a one, in turn comprises processor-executable computer instructions 604 configured to operate according to one or more of the principles set forth herein. In some embodiments, the processor-executable computer instructions 604 are configured to perform at least some of the exemplary methods 602 disclosed herein, such as method 200 of FIG. 2 and/or method 400 of FIG. 4, for example. In some embodiments, the processor-executable computer instructions 604 are configured to implement a system, such as at least some of the exemplary systems disclosed herein, such as system 100 of FIGS. 1A and 1B, system 300 of FIG. 3, and/or system 500 of FIGS. 5A and 5B, for example. Many such computer-readable media are contemplated to operate in accordance with the techniques presented herein.

In some embodiments, the described methods and/or their equivalents may be implemented with computer executable instructions. Thus, in some embodiments, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In some embodiments, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, magnetic tape, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
evaluating an incoming write operation to identify an indirect block of data targeted by the incoming write operation;
caching the indirect block into a log record created within a journal for the incoming write operation, wherein the caching includes:
identifying available free space within a header of the log record used to store metadata;
modifying the indirect block to reduce a size of the indirect block to create a modified indirect block having a reduced size that fits within the available free space; and
storing the modified indirect block into the available free space of the header; and
initiating a failover in response to detecting a failure, wherein the failover includes a replay process that stores indirect blocks from the log records into memory.

2. The method of claim 1, wherein the replay process:
generates file system messages for each log record for updating a file system to a consistent state reflected by write operations logged within the journal.

3. The method of claim 2, wherein the replay process:
executes the file system messages, utilizing the indirect blocks within the memory, to update the file system.

4. The method of claim 3, wherein the indirect blocks indicate disk locations of data of the write operations logged within the log records.

5. The method of claim 4, comprising:
performing a consistency point to store data of the write operation to distributed storage of a distributed storage architecture, wherein the indirect block, loaded from the log record to the memory, is modified.

6. The method of claim 4, comprising:
performing a consistency point to store data of the write operation to distributed storage of a distributed storage architecture.

7. The method of claim 1, comprising:
storing a buftree identifier, a file block number, and a consistency point count into the log record as context information.

8. The method of claim 7, wherein the context information is read from the log record to verify the indirect block as not being corrupt and that the indirect block is pointing a file system to correct data.

9. The method of claim 1, comprising:
storing a raid checksum into the log record, wherein the raid checksum is subsequently read from the log record to verify the indirect block.

10. The method of claim 1, comprising:
formatting the log record as one or more journal blocks that are sized and aligned to a fixed block size.

11. The method of claim 10, comprising:
sharing data within the journal blocks with a consistency point process that implements a consistency point to write data within the journal blocks to distributed storage.

12. A computing device comprising:
a memory comprising machine executable code; and
a processor coupled to the memory, the processor configured to execute the machine executable code to cause the processor to:
evaluate an incoming write operation to identify an indirect block of data targeted by the incoming write operation;
cache the indirect block into a log record created within a journal for the incoming write operation, wherein the indirect block is cached by:
identifying available free space within a header of the log record used to store metadata;
compressing the indirect block to reduce a size of the indirect block to create a modified indirect block having a reduced size that fits within the available free space; and
storing the modified indirect block into the available free space of the header; and
initiate a failover in response to detecting a failure, wherein the failover includes a replay process that stores indirect blocks from the log records into memory.

13. The computing device of claim 12, wherein the machine executable code causes the processor to:
store, during the replay process, the indirect blocks from the log records into an in-memory hash table indexed by disk locations identified by the indirect blocks.

14. The computing device of claim 12, wherein the machine executable code causes the processor to:
generate file system messages for each log record for updating a file system; and
execute the file system messages that utilize the indirect blocks within the memory to update the file system.

15. The computing device of claim 14, wherein the indirect blocks indicate disk locations of data of the write operations logged within the log records.

16. The computing device of claim 15, wherein the machine executable code causes the processor to:
perform a consistency point to store data of the write operation to distributed storage of a distributed storage architecture, wherein the indirect block, loaded from the log record to the memory, is modified.

17. A non-transitory machine readable medium comprising instructions for performing a method, which when executed by a machine, causes the machine to:
evaluate an incoming write operation to identify an indirect block of data targeted by the incoming write operation;
cache the indirect block into a log record created within a journal for the incoming write operation, wherein the indirect block is cached by:
identifying available free space within a header of the log record used to store metadata;

removing a portion of the indirect block to reduce a size of the indirect block to create a modified indirect block having a reduced size that fits within the available free space; and storing the modified indirect block into the available free space of the header; and initiate a failover in response to detecting a failure, wherein the failover includes a replay process that stores indirect blocks from the log records into memory.

18. The non-transitory machine readable medium of claim 17, wherein the instructions cause the machine to:
generate file system messages for each log record for updating a file system.

19. The non-transitory machine readable medium of claim 18, wherein the instructions cause the machine to:
execute the file system messages that utilize the indirect blocks within the memory to update the file system.

20. The non-transitory machine readable medium of claim 19, wherein the indirect blocks indicate disk locations of data of the write operations logged within the log records.

\* \* \* \* \*